(12) United States Patent
Pechanec et al.

(10) Patent No.: US 8,725,765 B2
(45) Date of Patent: May 13, 2014

(54) HIERARCHICAL REGISTRY FEDERATION

(75) Inventors: Jiri Pechanec, Mokra-Horakov (CZ);
Martin Vecera, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 306 days.

(21) Appl. No.: 12/838,373

(22) Filed: Jul. 16, 2010

(65) Prior Publication Data

US 2012/0016891 A1    Jan. 19, 2012

(51) Int. Cl.
*G06F 7/00* (2006.01)
*G06F 17/30* (2006.01)

(52) U.S. Cl.
USPC .............................. 707/770; 707/795; 707/798

(58) Field of Classification Search
USPC ........................... 707/765–767, 794, 795, 798
See application file for complete search history.

(56) References Cited

U.S. PATENT DOCUMENTS

| | | | | |
|---|---|---|---|---|
| 4,774,655 | A * | 9/1988 | Kollin et al. | 1/1 |
| 6,477,573 | B1 * | 11/2002 | Lea | 709/224 |
| 6,498,795 | B1 * | 12/2002 | Zhang et al. | 370/400 |
| 7,403,941 | B2 * | 7/2008 | Bedworth et al. | 1/1 |
| 7,814,226 | B2 | 10/2010 | Patrick | |
| 8,171,337 | B2 | 5/2012 | Peters et al. | |
| 8,275,985 | B1 | 9/2012 | Narayanan et al. | |
| 8,285,672 | B2 | 10/2012 | Wells et al. | |
| 2001/0056414 | A1 * | 12/2001 | Christal et al. | 707/1 |
| 2005/0050084 | A1 * | 3/2005 | Atm | 707/102 |
| 2005/0262102 | A1 * | 11/2005 | Anderson et al. | 707/10 |
| 2006/0173987 | A1 | 8/2006 | Friesen et al. | |
| 2007/0033167 | A1 | 2/2007 | Basu et al. | |
| 2008/0015916 | A1 | 1/2008 | Cossey et al. | |
| 2008/0069082 | A1 | 3/2008 | Patrick | |
| 2008/0069124 | A1 | 3/2008 | Patrick | |
| 2008/0294757 | A1 | 11/2008 | Bachmann et al. | |
| 2009/0204612 | A1 * | 8/2009 | Keshavarz-Nia et al. | 707/6 |
| 2010/0251010 | A1 | 9/2010 | Peters et al. | |
| 2011/0107352 | A1 | 5/2011 | Wells et al. | |
| 2011/0208806 | A1 | 8/2011 | Pechanec et al. | |
| 2012/0016891 | A1 | 1/2012 | Pechanec et al. | |
| 2012/0185725 | A1 | 7/2012 | Peters et al. | |

OTHER PUBLICATIONS

Rompothong et al. "A Query Federation of UDDI Registries" 2003. In Proceedings of the 1st international symposium on Information and communication technologies (ISICT '03). Trinity College Dublin. pp. 561-566.*

Jagatheesan et al. "Sangam: Universal Interop Protocols for E-ServiceBrokering Communities using Private UDDI Nodes". Submitted to the IEEE Symposium on Computers and Communications (ISCC'2003), Kemer-Antalya, Turkey, Jun./Jul. 2003. 21 pages.*

Duan "Design Principles of a Federated Service-oriented Architecture Model for Net-centric Data Sharing". Oct. 2009. The Journal of Defense Modeling and Simulation: Applications, Methodology, Technology. vol. 6 No. 4. pp. 165-176.*

(Continued)

*Primary Examiner* — James E Richardson
(74) *Attorney, Agent, or Firm* — Lowenstein Sandler LLP

(57) ABSTRACT

Some embodiments of a system and a method to implement a hierarchical registry federation have been presented. For instance, a registry federation can be stored in a set of one or more storage devices, the registry federation including multiple registries, each registry having one or more records. The registries can be organized in an oriented graph such that each registry is logically connected to another registry in the registry federation as a parent registry or a child registry.

12 Claims, 6 Drawing Sheets

(56) References Cited

OTHER PUBLICATIONS

Manepalli. "Federation of Metadata Registries". Corporation for National Research Initiatives. Presented at the International Conference on Semantic Web and Digital Libraries (ICSD-2007). Bangalore, India. Feb. 2007. 14 Pages.*

Johnson et al. Tree traversal Techniques to Implement Enhanced Searches in Tree View. IBM Technical Disclosure Bulletin. 1995. vol. 38 No. 2. Published on the Internet by IP.com on Mar. 30, 2005.*

Sommers, F., "What's New in UDDI 3.0—Part 3: Federating UDDI registries", accessed at: http://www.webservices.org/categories/technology/registry_uddi/what_s_new_in_uddi_3_0_part_3/(go)/Articles on Feb. 5, 2010, last updated Feb. 9, 2003, 3 pages.

"UDDI Version 3.0.2—UDDI Spec Technical Committee Draft, Dated Oct. 19, 2004", accessed at: http://uddi.org/pubs/uddi_v3.htm on Feb. 5, 2010, 245 pages.

Li et al., "Research on Semantic-based web services registry federation", 2005, Proceedings on the 4th international conference on Grid and Cooperative computing, pp. 202-207.

Sivashanmugam et al., "Discovery of Web services in a federated registry environment", Jul. 6-9, 2004, International Conference on Web Services 2004 Proceedings IEEE, pp. 270-278.

USPTO; Restriction Requirement for U.S. Appl. No. 12/712,028, mailed Aug. 30, 2012.

USPTO; Notice of Allowance for U.S. Appl. No. 12/712,028, mailed Nov. 21, 2012.

* cited by examiner

HIERARCHICAL REGISTRY FEDERATION

TECHNICAL FIELD

Embodiments of the present invention relate to registry federation, and more specifically to a hierarchical registry federation.

BACKGROUND

Currently, many businesses develop web service systems. To promote interoperability, web service standards, such as Universal Description, Discovery, and Integration (UDDI) web service standard, have been defined. Web services broadly refer to any service capable of being described by a binding template. Typically, web services are used for machine-to-machine communication, and they share much of the technology that underlies the World Wide Web, such as Transfer Control Protocol/Internet Protocol (TCP/IP), Hypertext Transfer Protocol (HTTP), and Extended Markup Language (XML).

A web service system typically includes one or more nodes. As used herein, a node broadly refers to a collection of web services, each of which implements the APIs in a pre-defined API set, such as a UDDI API set, and that are managed according to a common set of policies. One or more nodes may be combined to form a registry. The nodes in a registry collectively manage a particular set of data. This data may include one or more records. A registry federation is a collection of registries logically arranged in a predetermined topology. Multiple registries within the registry federation may cooperate with each other based on the rule that a registry can promote into an affiliate or a root registry. Conventionally, one registry can promote a record into another registry within the registry federation by copying the record to the other registry. However, the problem with this approach is that the records copied have to be kept in synchronization in all registries involved. It is generally time-consuming to copy records between the registries. Furthermore, some registries may not receive the updated records in time.

BRIEF DESCRIPTION OF THE DRAWINGS

The present invention is illustrated by way of example, and not by way of limitation, in the figures of the accompanying drawings and in which.

DETAILED DESCRIPTION

Figure 1:
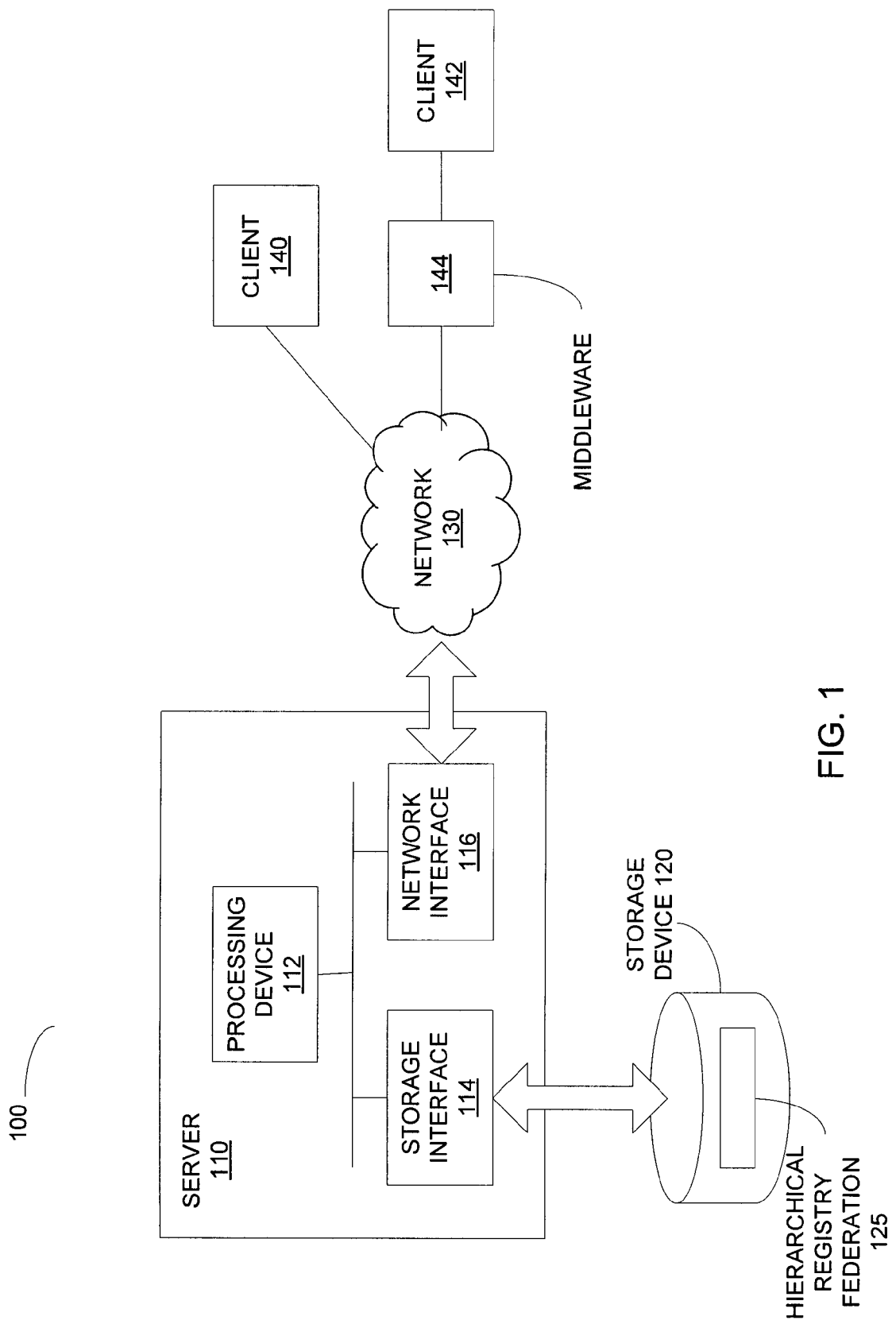
FIG. 1 illustrates one embodiment of a computing system usable in some embodiments of the invention.

Described herein are some embodiments of a method, an apparatus, and a system to implement a hierarchical registry federation. The techniques disclosed herein are generally applicable to web service systems, such as Universal Description, Discovery, and Integration (UDDI) web service system.

In one embodiment, a registry federation can be stored in a set of one or more storage devices, the registry federation including multiple registries, each registry having one or more records. The registries can be organized in an oriented graph such that each registry is logically connected to another registry in the registry federation as a parent registry or a child registry. More details of some embodiments of how to implement a hierarchical registry federation are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "organizing" or "searching" or "returning" or "executing" or "storing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates one embodiment of a computing system usable in some embodiments of the invention. The computing system 100 includes a server 110, a storage device 120, a network 130, a middleware 144, and some clients 140 and 142. The server 110 and clients 140 and 142 may be implemented on one or more computing machines, such as a desktop personal computer, a laptop computer, a personal digital assistant, etc. The server 110 and the client 140 are communicably coupled to each other via the network 130. The server 110 is further communicably coupled to the client 142 through the middleware 144 and the network 130. The network 130 may include various types of network, such as, for example, a public network (e.g., the Internet), a private network (e.g., a local area network), a wireless network, a wirelined network, etc. The server 110 is also coupled to the storage device 120. The storage device 120 may include one or more various types of machine-readable storage media, such as, optical disks, CD-ROMs, and magnetic-optical disks, magnetic or optical cards, or any type of media suitable for storing electronic data. The storage device 120 stores a hierarchical registry federation 125, which may be created and managed by the server 110.

In some embodiments, the server 110 includes a processing device 112, a storage interface 114, and a network interface 116. The processing device 112 represents one or more general-purpose processing devices such as a microprocessing device, a central processing unit, or the like. More particularly, the processing device 112 may be complex instruction set computing (CISC) microprocessing device, reduced instruction set computing (RISC) microprocessing device, very long instruction word (VLIW) microprocessing device, or processing device implementing other instruction sets, or processing devices implementing a combination of instruction sets. The processing device 112 may also be one or more special-purpose processing devices such as an application specific integrated circuit (ASIC), a field programmable gate array (FPGA), a digital signal processing device (DSP), network processing device, or the like. The processing device 112 is configured to create and organize the hierarchical registry federation 125 as described below.

The server 110 further includes the storage interface 114, such as a serial Advanced Technology Attachment (SATA) host adaptor. Via the storage interface 114, the server 110 may communicate with the storage device 120. Via the network interface 116, the server 110 may communicate with machines or devices coupled to the network 130, such as the clients 140 and 142. Note that in some alternate embodiments, the server 110 further includes a storage device internally to store at least part of a hierarchical registry federation. The internal storage device may include one or more read-only memory (ROM), flash memory, dynamic random access memory (DRAM) such as synchronous DRAM (SDRAM), and/or a static memory (e.g., flash memory, static random access memory (SRAM), etc.). Note that the server 110 may include additional components in other embodiments, such as, for example, a video display unit (e.g., a liquid crystal display (LCD) or a cathode ray tube (CRT)), an alphanumeric input device (e.g., a keyboard), a cursor control device (e.g., a mouse), and/or a signal generation device (e.g., a speaker), etc. To illustrate how the server 110 creates and organizes the hierarchical registry federation 125, some examples are discussed in details below.

In some embodiments, the processing device 112 creates registries and stores one or more records in each registry created. For instance, the registries may include UDDI registries. Furthermore, the processing device 112 may logically arrange the registries into an oriented graph to form a registry federation, such as a tree having a root registry and a number of affiliate registries. Broadly speaking, an oriented graph is a graph having a set of nodes connected to each other via a set of edges, each of the edges having a direction assigned to it. The processing device 112 may associate a registry with a distinct node in an oriented graph. A registry may be immediately connected via an edge in the oriented graph to another registry (i.e., another node in the oriented graph). As such, each registry in the oriented graph could be connected to one or more other registries in the registry federation 125 as a parent registry and/or a child registry. Logical links (e.g., pointers) may be stored in each registry to logically refer the respective registry to its parent registry and/or child registries such that the respective registry is aware of which registries it is logically connected to. Each logical link may include an address or a pathname of the registry that the respective registry is logically connected to. The processing device 112 stores at least part of the registry federation 125 in the storage device 120 via the storage interface 114.

When a client, such as the client 140, requests to access a record, the server 110 may search for the record in a registry of the registry federation 125 that the server 110 is currently accessing. If the server 110 does not find the record requested in the current registry, then a child or a parent registry of the current registry may be searched for the record requested. The search may be done recursively such that both child and parent registries can also ask in their respective child and parent registries. Further, the search can be done either in child registries first and parent registry last, or vice versa. Moreover, in some embodiments, precedents of records (e.g., in the case of conflicting records) may be defined which may dictate whether the child registries or the parent registry should be searched first. Some examples are discussed in details below with reference to FIGS. 2A-2B to illustrate record searching in a hierarchical registry federation in some embodiments.

One advantage of the above approach is to eliminate the need to copy records from one registry to another when the two registries are affiliated, as in some conventional UDDI registry federations. Further, synchronization of records between multiple registries is also not required under the above approach because the records are not copied from one registry to another registry. Thus, management and maintenance of the registry federation 125 can be greatly simplified.

Figure 2A:
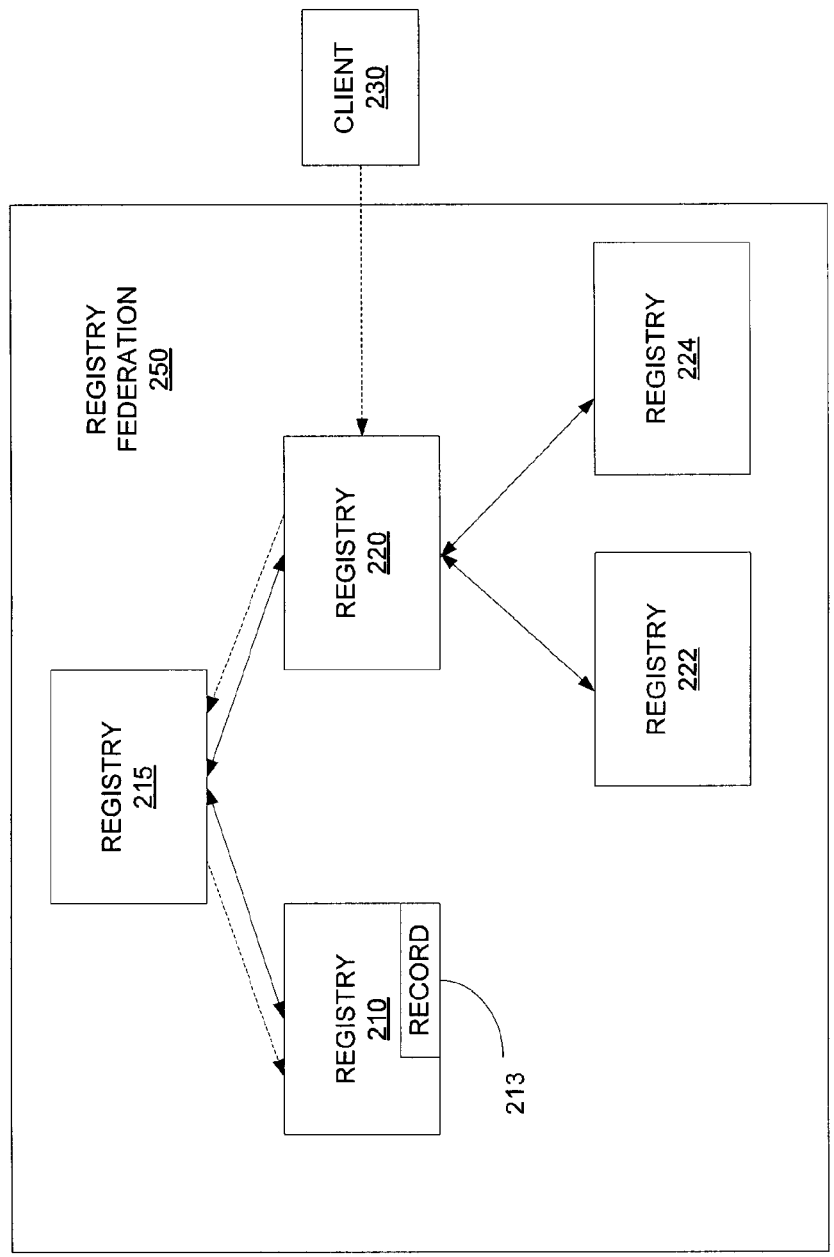
FIG. 2A illustrates one embodiment of record searching in a hierarchical registry federation.

FIG. 2A illustrates one embodiment of record searching in a hierarchical registry federation. In the current example, a client 230 sends a request for a record 213 to a server (such as the server 110 in FIG. 1) managing the registry federation 250. In response to the request, the server searches the registry that it is currently at, which is registry 220 in the current example. But the record 213 is not in the registry 220. Suppose in the current example, parent registries have higher priority over child registries. Thus, if a record is not found in a registry, the server has to check its parent registry, if available, before checking its child registries. After determining that the registry 220 does not contain the record 213, the server may find a parent registry of the registry 220, i.e., registry 215, using a link stored in the registry 220. Then the server may move onto the registry 215, and search for record 213 in registry 215. Note that parent registries take priority over child registries in the current example, and therefore, the server does not search the child registries 222 and 224 of the registry 220 before searching registry 215. Again, the record 213 is not in the registry 215. The server may attempt to find the parent registry of the registry 215, but none exists in the current example. Rather, the server finds a child registry, i.e., registry 210, of registry 215 using the link stored in the registry 215. Therefore, the server moves onto registry 210 using the link stored in registry 215 to search in registry 210. In registry 210, the server finds the record 213. The server returns the record 213 found to the client 230, and the search ends.

Figure 2B:
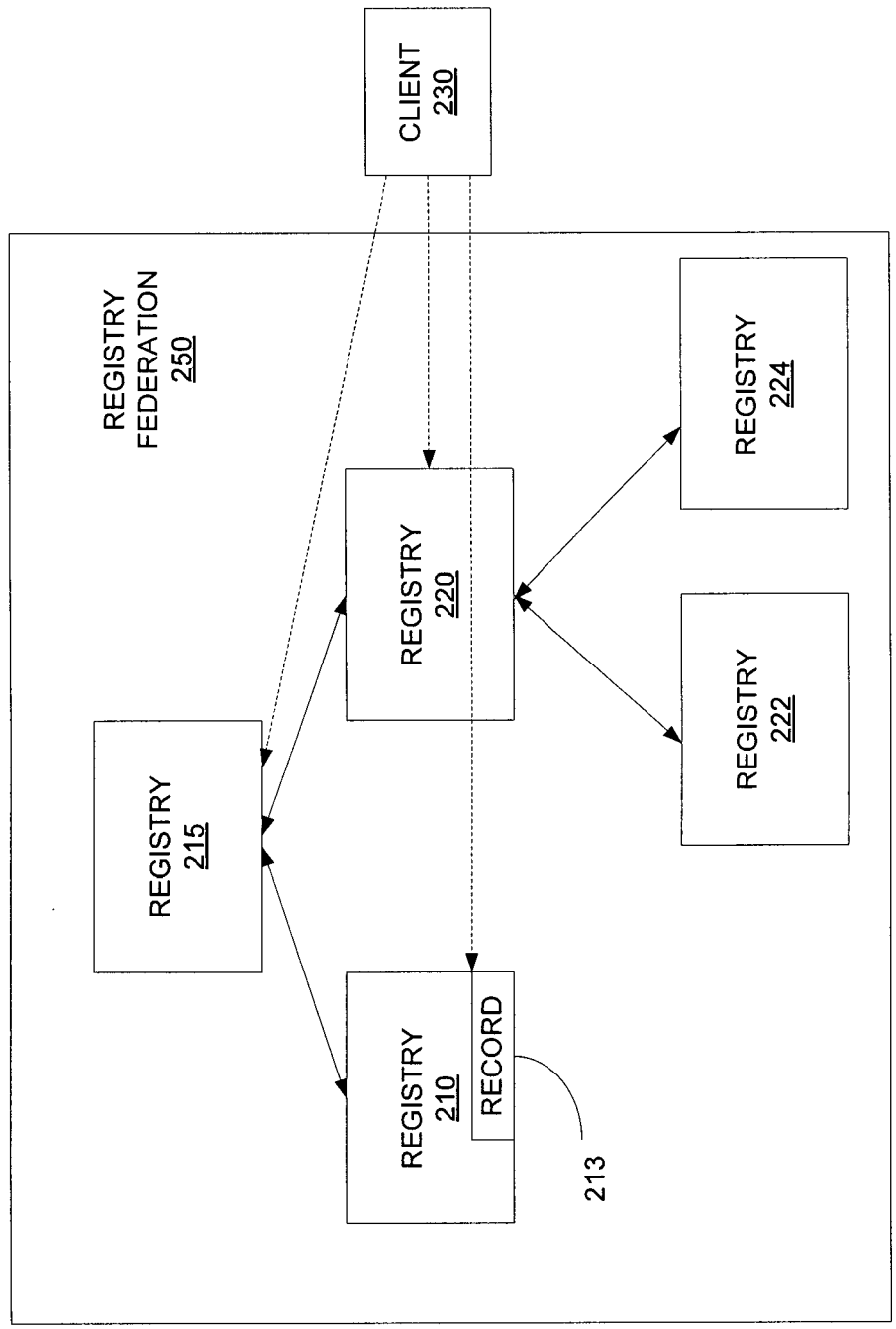
FIG. 2B illustrates a second embodiment of record searching in a hierarchical registry federation.

FIG. 2B illustrates an alternate embodiment of record searching in a hierarchical registry federation 250. In the current example, a client 230 sends a request for a record 213 to a server (such as the server 110 in FIG. 1) managing the registry federation 250. In response to the request, the server searches the registry that it is currently at, which is registry 220 in the current example. But the record 213 is not in the registry 220. Again, assume parent registries take priority over child registries in the current example as well. As a result, the address of the parent registry, i.e., registry 215, is returned to the client 230. Using the address of registry 215, the client searches for the record 213 in the registry 215. The record 213 is not in the registry 215. However, since the registry 215 has no parent registry, the address of its child registry, i.e., registry 210, is returned to the client 230. Using the address of registry 210, the client 230 searches for the record 213 in the registry 210. The record 213 is in the registry 210, and therefore, the record 213 is returned to the client 230, and the search ends.

Figure 3A:
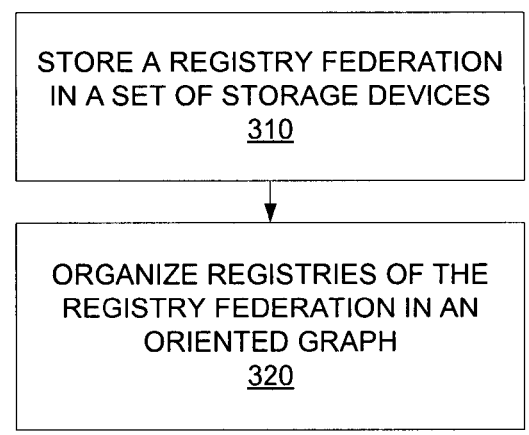
FIG. 3A illustrates a flow diagram of one embodiment of a method to create a hierarchical registry federation.

FIG. 3A illustrates a flow diagram of one embodiment of a method to create a hierarchical registry federation. The method may be performed by processing logic that may comprise hardware (e.g., circuitry, dedicated logic, programmable logic, microcode, etc.), software (such as instructions run on a processing device), firmware, or a combination thereof. For instance, the server 110 illustrated in FIG. 1 may perform at least part of the method in some embodiments.

Initially, processing logic stores a registry federation of a web service system in a set of storage devices (processing block 310). For example, the registry federation may include UDDI registries. The storage devices may include storage devices internal to a computing system (e.g., hard disk), and/or storage devices external to a computing system (e.g., optical disks, magnetic tapes, etc.). Then processing logic organizes the registries in the registry federation into an oriented graph, such as a tree (processing block 320). Details of an oriented graph have been discussed above with reference to FIG. 1.

Figure 3B:
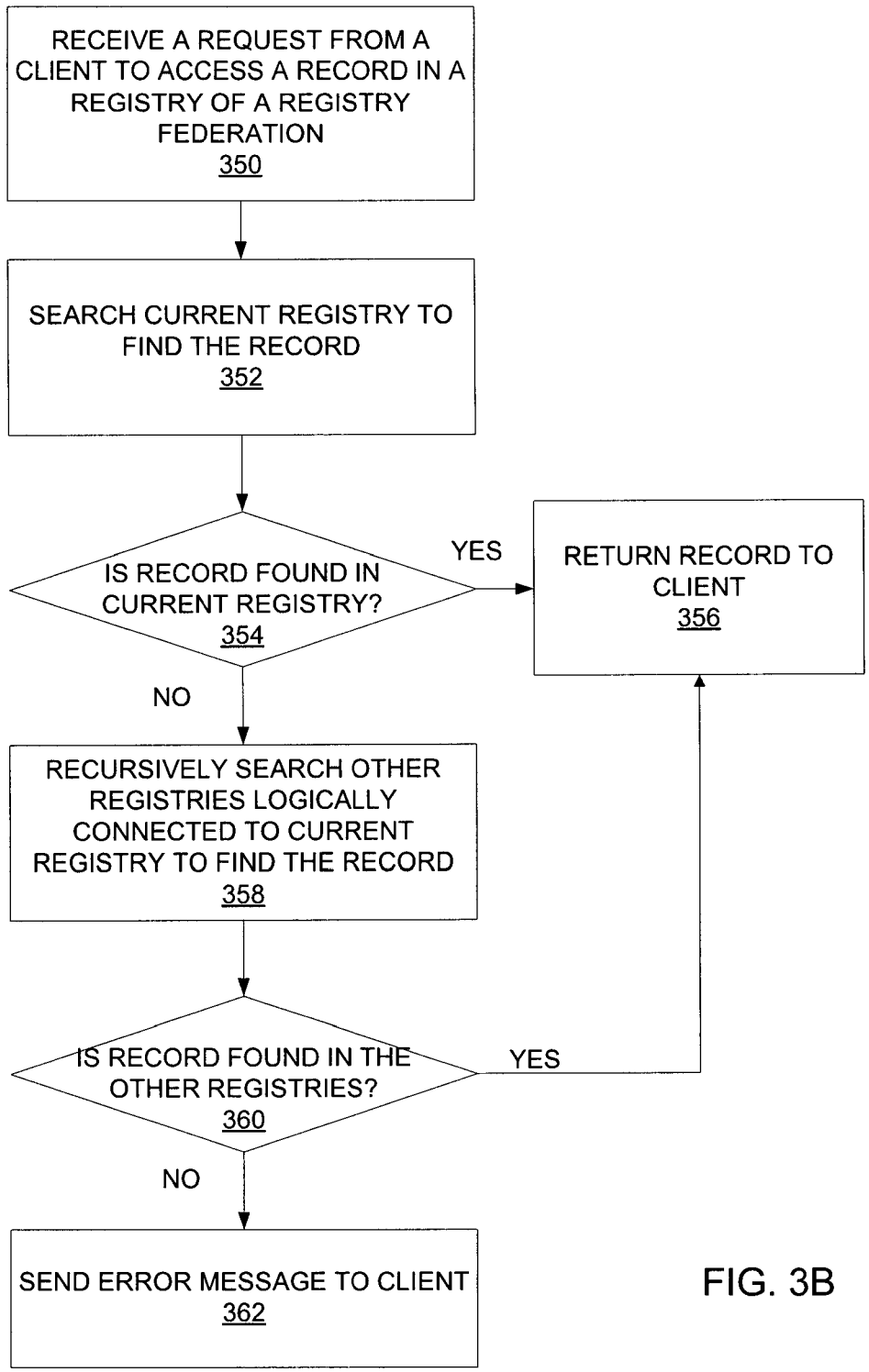
FIG. 3B illustrates a flow diagram of one embodiment of a method to search for a record in a hierarchical registry federation.

FIG. 3B illustrates a flow diagram of one embodiment of a method to search for a record in a hierarchical registry federation, such as the one created according to the method shown in FIG. 3A. The method may be performed by processing logic that may comprise hardware (e.g., circuitry, dedicated logic, programmable logic, microcode, etc.), software (such as instructions run on a processing device), firmware, or a combination thereof. For instance, the server 110 illustrated in FIG. 1 may perform at least part of the method in some embodiments.

Initially, processing logic receives a request from a client to access a record in a registry of the hierarchical registry federation (processing block 350). Processing logic may search a current registry to find the record (processing block 352). Processing logic checks if the record is in the current registry (processing block 354). If the record is in the current registry, then processing logic returns the record found to the client (processing block 356). Otherwise, if the record is not found in the current registry, processing logic may search recursively other registries logically connected to the current registry to try to find the record (processing block 358). The recursive search may be performed according to a particular priority policy previously defined for the hierarchical registry federation. For example, parent registries may take priority over child registries according to one policy, and vice versa according to another policy.

In some embodiments, processing logic checks if the record is in the other registries (processing block 360). If the record is in one of the other registries, then processing logic returns the record found to the client (processing block 356). Otherwise, processing logic sends an error message to the client (processing block 362).

Because the search is performed by processing logic maintaining and managing the hierarchical registry federation under the above approach, it is backward compatible with many conventional standards.

Figure 3C:
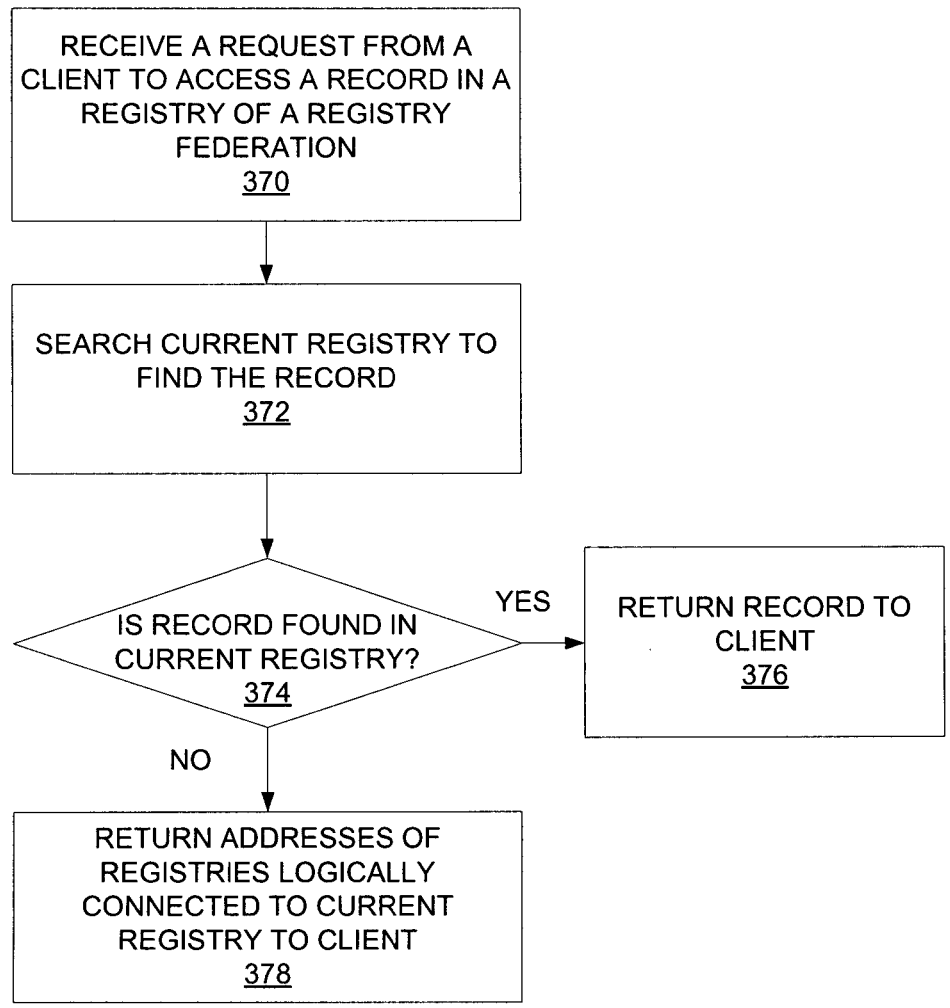
FIG. 3C illustrates a flow diagram of an alternate embodiment of a method to search for a record in a hierarchical registry federation.

FIG. 3C illustrates a flow diagram of an alternate embodiment of a method to search for a record in a hierarchical registry federation, such as the one created according to the method shown in FIG. 3A. The method may be performed by processing logic that may comprise hardware (e.g., circuitry, dedicated logic, programmable logic, microcode, etc.), software (such as instructions run on a processing device), firmware, or a combination thereof. For instance, the server 110 illustrated in FIG. 1 may perform at least part of the method in some embodiments.

Initially, processing logic receives a request from a client to access a record in a registry of the hierarchical registry federation (processing block 370). In response to the request, processing logic search a current registry to find the record (processing block 372). Processing logic checks if the record is in the current registry (processing block 374). If the record is in the current registry, then processing logic returns the record found to the client (processing block 376). Otherwise, if the record is not found in the current registry, processing logic may return addresses of registries logically connected to the current registry to the client, such as parent registries and/or child registries of the current registry (processing block 378). Using the addresses returned, the client may subsequently search the registries logically connected to the current registry for the record.

Note that the above approach shifts the workload of recursively searching registries to the client, and thus, it does not demand high performance on the part of the processing logic that maintains and manages the hierarchical registry federation. However, unlike the approach illustrated in FIG. 3B, the above approach may not be backward compatible with some conventional standards.

Thus, some embodiments of a system and a method to implement a hierarchical registry federation have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:
1. A method comprising:
storing a registry federation in a storage device, the registry federation representing a plurality of registries;
organizing, by a server coupled to the storage device, the plurality of registries in the registry federation as a tree graph such that each of the plurality of registries is logically connected to at least one of a parent registry above or a child registry below in the tree graph of the plurality of registries;

in response to receiving a request from a client to find a record in an initial registry of the plurality of registries, searching, by the server, the initial registry for the record requested;

in response to determining that the record is not found in the initial registry, recursively searching, by the server, other registries of the plurality of registries that are logically connected to the initial registry until the record is found in one of the other registries, wherein each individual registry of the plurality of registries is configurable to first search through parent registries of the individual registry in response to determining that the record is not found in the individual registry and is configurable to first search through child registries of the individual registry in response to determining that the record is not found in the individual registry, wherein recursively searching the other registries comprises first searching through parent registries of a first registry in the plurality of registries in response to determining that the first registry is configured to first search through parent registries of the first registry and that the record is not found in the first registry, and wherein recursively searching the other registries comprises first searching through child registries of a second registry in the plurality of registries in response to determining that the second registry is configured to first search through child registries of the second registry and that the record is not found in the second registry.

2. The method of claim 1, further comprising returning to the client the record found.

3. The method of claim 2, wherein the plurality of registries comprise a plurality of Universal Description, Discovery, and Integration (UDDI) registries.

4. An apparatus comprising:
a storage interface to communicably couple to a storage device to store a registry federation representing a plurality of registries;
a hardware processing device coupled to the storage interface, to organize the plurality of registries in the registry federation as a tree graph such that each of the plurality of registries is logically connected to at least one of a parent registry above or a child registry below in the tree graph of the plurality of registries;
a network interface communicably coupled to a network, to receive a request from a client coupled to the network to find a record in an initial registry of the plurality of registries, wherein, in response to receipt of the request, the hardware processing device is further to search the initial registry for the record requested, and in response to a determination that the record is not found in the initial registry, the hardware processing device is further to recursively search other registries of the plurality of registries that are logically connected to the initial registry until the record is found in one of the other registries, wherein each individual registry of the plurality of registries is configurable to first search through parent registries of the individual registry in response to a determination that the record is not found in the individual registry and is configurable to first search through child registries of the individual registry in response to the determination that the record is not found in the individual registry, wherein the hardware processing device is to recursively search the other registries by first searching through parent registries of a first registry in the plurality of registries in response to a determination that the first registry is configured to first search through parent registries of the first registry and that the record is not found in the first registry, and wherein the hardware processing device is to recursively search the other registries by first searching through child registries of a second registry in the plurality of registries in response to a determination that the second registry is configured to first search through child registries of the second registry and that the record is not found in the second registry.

5. The apparatus of claim 4, wherein the hardware processing device is further to return the record found to the client.

6. The apparatus of claim 5, wherein the plurality of registries comprise a plurality of Universal Description, Discovery, and Integration (UDDI) registries.

7. The apparatus of claim 5, further comprising the storage device.

8. A system comprising:
a client apparatus communicably coupled to a network; and
a server apparatus comprising:
a storage interface to communicably couple to a storage device to store a registry federation representing a plurality of registries,
a hardware processing device coupled to the storage interface, to organize the plurality of registries in the registry federation as a tree graph such that each of the plurality of registries is logically connected to at least one of a parent registry above or a child registry below in the tree graph of the plurality of registries,
a network interface communicably coupled to the network, to receive a request from the client apparatus to find a record in an initial registry of the plurality of registries, wherein, in response to receipt of the request, the hardware processing device is further to search the initial registry for the record requested, and in response to a determination that the record is not found in the initial registry, the hardware processing device is further to recursively search other registries of the plurality of registries that are logically connected to the initial registry until the record is found in one of the other registries, wherein each individual registry of the plurality of registries is configurable to first search through parent registries of the individual registry in response to a determination that the record is not found in the individual registry and is configurable to first search through child registries of the individual registry in response to the determination that the record is not found in the individual registry, wherein the hardware processing device is to recursively search the other registries by first searching through parent registries of a first registry in the plurality of registries in response to a determination that the first registry is configured to first search through parent registries of the first registry and that the record is not found in the first registry, and wherein the hardware processing device is to recursively search the other registries by first searching through child registries of a second registry in the plurality of registries in response to a determination that the second registry is configured to first search through child registries of the second registry and that the record is not found in the second registry.

9. The system of claim 8, wherein the hardware processing device is further to return the record found to the client apparatus.

10. A non-transitory computer-readable storage medium embodying instructions that, when executed by a hardware processing device at a server, cause the processing device to perform operations comprising:

storing a registry federation in a storage device, the registry federation representing a plurality of registries;

organizing, by the hardware processing device coupled to the storage device, the plurality of registries in the registry federation as a tree graph such that each of the plurality of registries is logically connected to at least one of a parent registry above or a child registry below in the tree graph of the plurality of registries;

in response to receiving a request from a client to find a record in an initial registry of the plurality of registries, searching, by the server, the initial registry for the record requested;

in response to determining that the record is not found in the initial registry, recursively searching, by the server, other registries of the plurality of registries that are logically connected to the initial registry until the record is found in one of the other registries, wherein each individual registry of the plurality of registries is configurable to first search through parent registries of the individual registry in response to determining that the record is not found in the individual registry and is configurable to first search through child registries of the individual registry in response to determining that the record is not found in the individual registry, wherein recursively searching the other registries comprises first searching through parent registries of a first registry in the plurality of registries in response to determining that the first registry is configured to first search through parent registries of the first registry and that the record is not found in the first registry, and wherein recursively searching the other registries comprises first searching through child registries of a second registry in the plurality of registries in response to determining that the second registry is configured to first search through child registries of the second registry and that the record is not found in the second registry.

11. The computer-readable storage medium of claim 10, wherein the operations further comprise returning to the client the record found.

12. The computer-readable storage medium of claim 11, wherein the plurality of registries comprise a plurality of Universal Description, Discovery, and Integration (UDDI) registries.

* * * * *